(12) United States Patent
Bender et al.

(10) Patent No.: US 11,200,582 B2
(45) Date of Patent: Dec. 14, 2021

(54) ENSURING COMPLIANCE OF INTERNET OF THINGS (IOT) DEVICES

(71) Applicant: INTERNATIONAL BUSINESS MACHINES CORPORATION, Armonk, NY (US)

(72) Inventors: Michael Bender, Rye Brook, NY (US); Rhonda L. Childress, Austin, TX (US); David B. Kumhyr, Austin, TX (US); Maharaj Mukherjee, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 128 days.

(21) Appl. No.: 15/339,328

(22) Filed: Oct. 31, 2016

(65) Prior Publication Data
US 2018/0121931 A1 May 3, 2018

(51) Int. Cl.
| | |
|---|---|
| *H04L 12/26* | (2006.01) |
| *H04L 12/24* | (2006.01) |
| *G16Y 20/10* | (2020.01) |
| *G08B 17/00* | (2006.01) |
| *G16Y 10/80* | (2020.01) |
| *G16Y 40/50* | (2020.01) |
| *G16Y 40/35* | (2020.01) |
| *G16Y 40/40* | (2020.01) |
| *G16Y 10/75* | (2020.01) |
| *G16Y 10/35* | (2020.01) |

(Continued)

(52) U.S. Cl.
CPC ........... *G06Q 30/018* (2013.01); *G08B 17/00* (2013.01); *G08B 25/00* (2013.01); *G08B 29/00* (2013.01); *G16Y 10/80* (2020.01); *G16Y 20/10* (2020.01); *G16Y 30/00* (2020.01); *G16Y 40/35* (2020.01); *G16Y 40/40* (2020.01); *G16Y 40/50* (2020.01); *H04L 41/5009* (2013.01); *H04L 43/065* (2013.01); *H04L 43/08* (2013.01); *G16Y 10/35* (2020.01); *G16Y 10/75* (2020.01)

(58) Field of Classification Search
CPC ... H04L 43/065; H04L 41/5009; H04L 43/08; G06Q 30/018; G08B 25/00; G08B 29/00; G08B 29/185; G08B 19/00; G16Y 10/00; G16Y 10/35; G16Y 10/75; G16Y 10/80; G16Y 20/00; G16Y 30/00; G16Y 40/00; G16Y 20/10; G16Y 40/35; G16Y 40/40; G16Y 40/50
USPC ........................................................ 709/223
See application file for complete search history.

(56) References Cited

U.S. PATENT DOCUMENTS

2013/0179450 A1* 7/2013 Chitiveli ................. G06F 16/27
707/737
2014/0244017 A1 8/2014 Freiwirth et al.
(Continued)

FOREIGN PATENT DOCUMENTS

WO 2016095056 A1 6/2016

*Primary Examiner* — Emmanuel L Moise
*Assistant Examiner* — Xiang Yu
(74) *Attorney, Agent, or Firm* — Griffiths & Seaton PLLC (57) ABSTRACT

Embodiments for ensuring compliance of Internet of Things (IoT) devices in an IoT environment by a processor. One or more solutions may be provided for those of a plurality of sensor based devices in an IoT network identified as having performance obligation deficiencies according to a knowledge domain describes the performance obligations for the plurality of sensor based devices.

11 Claims, 6 Drawing Sheets

(51) Int. Cl.
*G08B 25/00* (2006.01)
*G08B 29/00* (2006.01)
*G16Y 30/00* (2020.01)
*G06Q 30/00* (2012.01)

(56) References Cited

U.S. PATENT DOCUMENTS

| | | | |
|---|---|---|---|
| 2015/0061859 A1* | 3/2015 | Matsuoka | G08B 27/00 |
| | | | 340/501 |
| 2015/0134194 A1* | 5/2015 | Beaujard | G07C 5/0808 |
| | | | 701/31.7 |
| 2016/0259923 A1 | 9/2016 | Papa et al. | |

* cited by examiner

ENSURING COMPLIANCE OF INTERNET OF THINGS (IOT) DEVICES

BACKGROUND OF THE INVENTION

Field of the Invention

The present invention relates in general to computing systems, and more particularly to, various embodiments for ensuring legal, contractual, or regulatory compliance of Internet of Things (IoT) devices in an IoT environment using a computing processor.

Description of the Related Art

In today's society, consumers, businesspersons, educators, and others use various computing systems in a variety of settings. Current network and communications technologies, such as machine-to-machine (M2M) technologies and the Internet, allow devices to communicate more directly with each other using wired and wireless communications systems. For example, the Internet provides for a system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet). In other words, the IoT can refer to uniquely identifiable devices and their virtual representations in an Internet-like structure.

SUMMARY OF THE INVENTION

Various embodiments for ensuring compliance of Internet of Things (IoT) devices in an IoT environment by one or more processors, are provided. In one embodiment, by way of example only, a method for ensuring compliance of Internet of Things (IoT) devices in an IoT environment, again by one or more processors, is provided. One or more solutions may be provided for those of a plurality of sensor based devices in an IoT network identified as having performance obligation deficiencies according to a knowledge domain that describes the performance obligations for the plurality of sensor based devices. Also, one or more solutions may be provided for an IoT network, comprising one or more IoT devices, identified as having performance obligation deficiencies according to a knowledge domain describing performance obligations for the IoT network. The advantage provided by the embodiments ensure that the IOT sensor based devices and the IoT network comply with all the legal requirements, contractual obligations, and/or regulatory requirements.

The performance obligation required for each of the plurality of sensor based devices may be identified in order to assist with ensuring that the IOT sensor based devices and the IoT network comply with all the legal requirements, contractual obligations, and/or regulatory requirements. A knowledge domain having an ontology of each performance obligation of the plurality of sensor-based devices may be parsed, created and stored and updated as needed. A performance capability may be determined of each of the plurality of sensor-based devices to enable identification of the performance obligation deficiencies according to the knowledge domain. Furthermore, the level or the degree of the performance obligation deficiency may be identified according to legal requirements, contractual obligations, regulatory requirements, or a combination thereof using an ontology included in the knowledge domain, and/or receive legal requirements, contractual obligations, and regulatory requirements in the knowledge domain in the IoT network from one or more external services to enable identification of the performance obligation deficiencies for one or more of the plurality of sensor based devices. These operations provide significant benefit in that the legal requirements, contractual obligations, and/or regulatory requirements may be ingested into the knowledge domain and parsed and analyzed using natural language processing (NLP) as well as specialized resources such as legal dictionary and handbooks to understand the legal requirements, contractual obligations, and/or regulatory requirements. The knowledge base can be further developed and corrected using human input for correct interpretation and categorization.

As another added feature and advantage over the current state of the art, one or more of the IoT devices, which may be a plurality of sensor-based devices in the IoT network identified as having the performance obligation deficiencies, may be calibrated to correct the performance obligation deficiencies according to the one or more solutions. This ensures ongoing accuracy and assurance that the IoT sensor based devices comply with all the legal requirements, contractual obligations, and/or regulatory requirements while increasing user confidence as to the reliability and accuracy of the compliance.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously indicated, the Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances may include thermostats, sensor based devices, smoke alarms, lights, home appliances, audio systems, televisions, security cameras, security sensors, and heating, ventilation, and air conditioning (HVAC) zones, among countless other examples. Many of these objects are devices that are independently operable, but they may also be paired with a control system or alternatively a distributed control system such as one running over a cloud computing environment.

Various devices often operate under differing standards, legal requirements, contractual obligations, and/or regulatory requirements and have their own input methods, and individually incorporating such devices into an automation system is tedious and complicated. Consider the following examples where various IoT devices have standards, legal requirements, contractual obligations, and/or regulatory requirements according to various geographical locations.

(1) In some cities it may be required by law that landlords turn on heating units if the temperature at their tenancy falls below a temperature threshold and turn on air conditioning units upon the air temperature rising above certain temperature threshold values. Landlords are also required to maintain smoke detectors as well as carbon dioxide (CO2) detectors.

(2) Certain regulatory or law enforcement agencies may require that radio frequency (RF) emissions of certain IoT devices must be limited within certain frequency bands as well as within defined strengths. The various RF emissions limits may vary from region to region.

(3) These regulatory or law enforcement agencies may require that certain IoT devices limit communication within certain bandwidth of the Internet to prevent clutter and denial of service for other devices.

(4) Contractual obligation may require that some IoT devices use certain levels of security protocol as well as encryption standards.

(5) Certain countries and regions may have special laws on privacy and profiling and metadata storage. For example, some countries may impose certain requirements regarding the collection and use of metadata for advertisement or other purpose.

The laws and/or regulations may vary from region-to-region and often change drastically. In some cases, the applicable laws may be dependent on weather, or other conditions, and the application of these laws or regulations may vary over time or season. It is therefore a great challenge to ensure that IoT devices, such as IoT sensors, and the IoT network each comply with legal regulations, contractual obligations, and/or regulatory regulations. The current state of the art fails to provide a solution for determining the purpose of individual sensors in a network while determining if the sensors are in compliance with local laws and jurisdictions by ingesting local laws and using natural language processing to understand the laws and recommending remediation for sensor compliance.

Accordingly, the present invention provides a solution for ensuring legal, contractual, and/or regulatory compliance of IoT devices in an IoT environment. In one embodiment, by way of example only, one or more solutions may be provided for those of a plurality of sensor based devices in an IoT network identified as having performance obligation deficiencies according to a knowledge domain that describes the performance obligations for the plurality of sensor based devices. Also, one or more solutions may be provided for an IoT network, comprising one or more IoT devices, identified as having performance obligation deficiencies according to a knowledge domain describing performance obligations for the IoT network.

In one aspect, mechanisms of the illustrated embodiments provide a solution for using virtual sensors to identify one or more predictors, construct a predictive model at one or more locations, and configure a set of virtual sensor models. Automatic identification and deployment of one or more virtual sensor models may be performed in order to minimize human error, increase computing efficiency, improve scalability, and provide a solution to the failure of a physical sensor or circumstance in which physical sensors are unable to measure certain physical phenomena.

As will be further described, the present invention provides one or more advantages and benefits to a user by ensuring legal, contractual, and/or regulatory compliance of IoT devices in an IoT environment by ingesting national, state, and/or local law applicable to a defined region, one or more proposed laws, regulatory regulations, and/or contracts for cognitive analysis into a knowledge domain that includes an ontology of the laws, regulations, and contracts applicable to each IoT device. By analyzing an ontology of the knowledge domain associated with the legal, regulatory, and/or contractual documents, one or more sections or provisions of the legal, regulatory, and/or contractual documents may be identified that relate to one or more of the IoT devices. Also, one or more sections or provisions of the legal, regulatory, and/or contractual documents may be identified as being in non-compliance with one or more IoT devices.

Gaps (e.g., performance deficiencies) may be identified in the one or more sections or provisions of the legal, regulatory, and/or contractual documents and may be identified via linguistic analysis to provide IoT device replacements or upgrades. In one aspect, one or more solutions may be provided for the IoT devices to become compliant. For example, IoT devices may be replaced, upgraded, moved to an alternative location, and/or calibrated. Also, non-compliant IoT devices, such as individual sensor based devices or a collection of sensor based devices, may be reviewed to ensure compliance. In one aspect, the IoT devices, as used herein, may be sensor-based devices in an IoT network.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
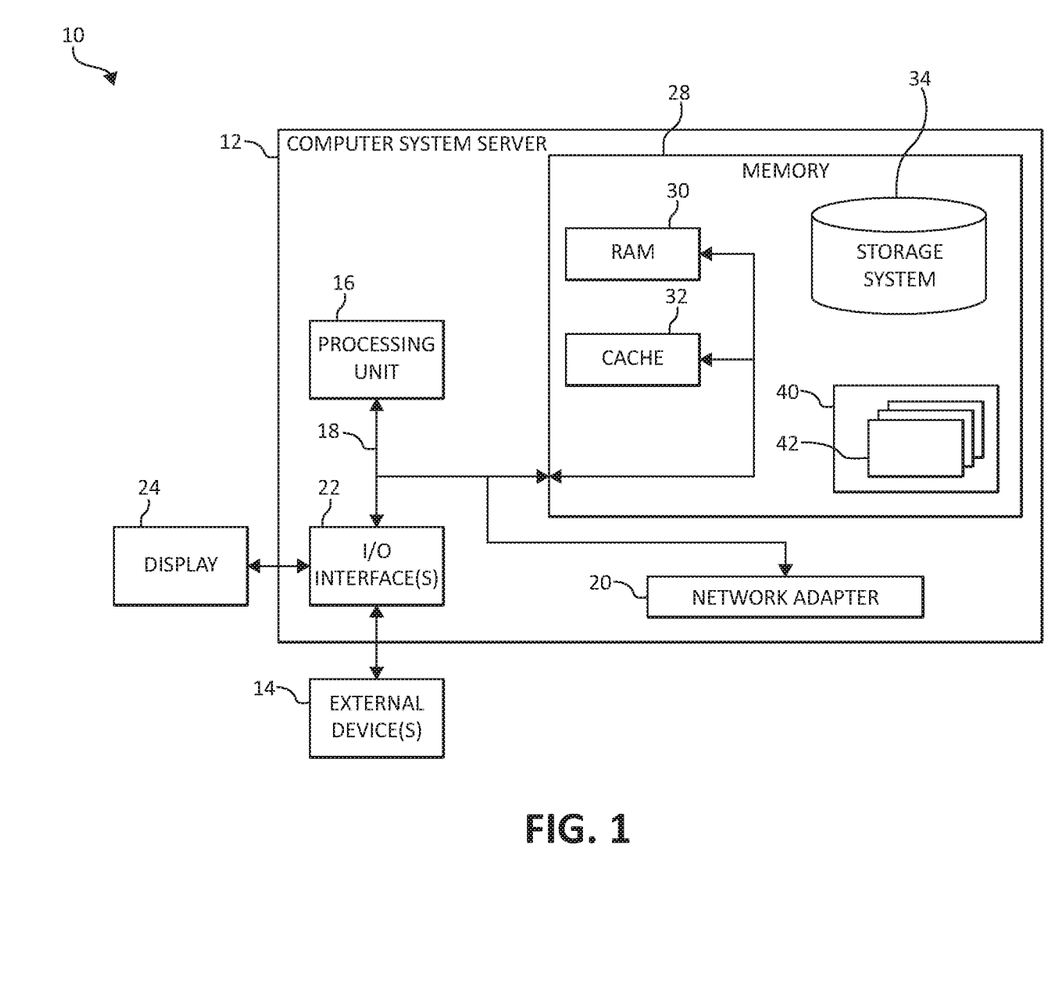
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network or IoT network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), an IoT network, and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
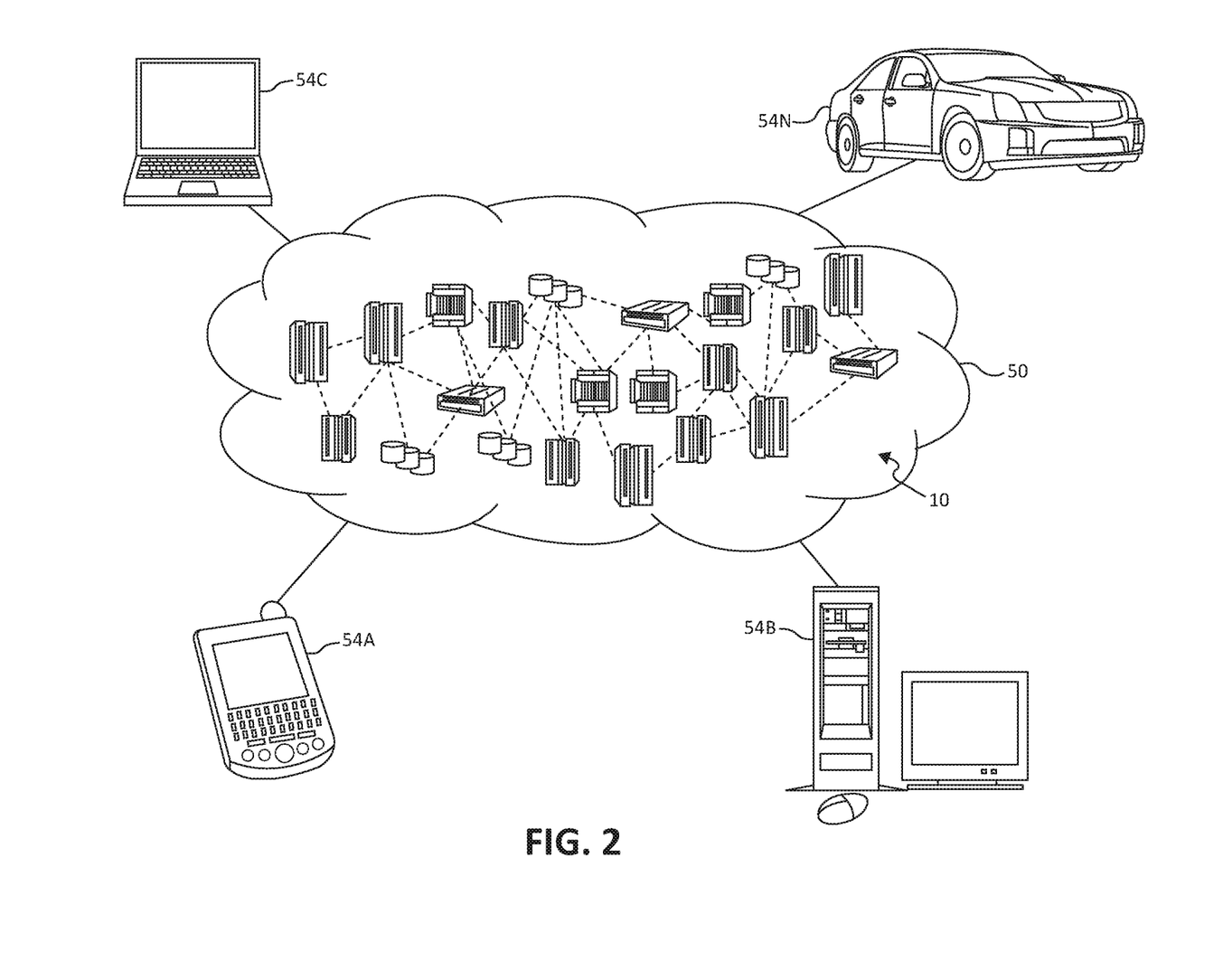
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
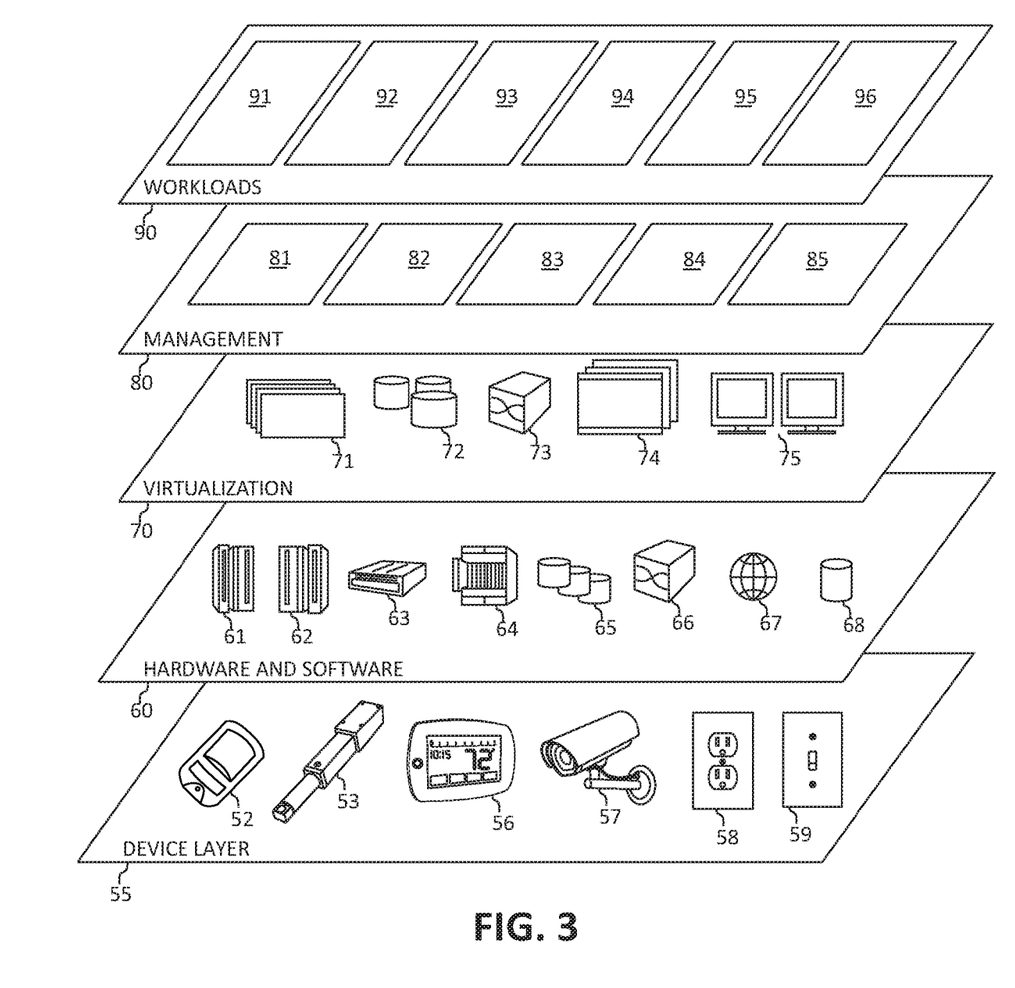
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various legal, contractual, and/or regulatory compliance of IoT device workloads and functions 96. In addition, legal, contractual, and/or regulatory compliance of IoT device workloads and functions 96 may include such operations as data analysis (including data collection and processing from various environmental sensors), legal, contractual, and/or regulatory compliance analysis, data analytics functions. One of ordinary skill in the art will appreciate that the legal, contractual, and/or regulatory compliance of IoT device workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
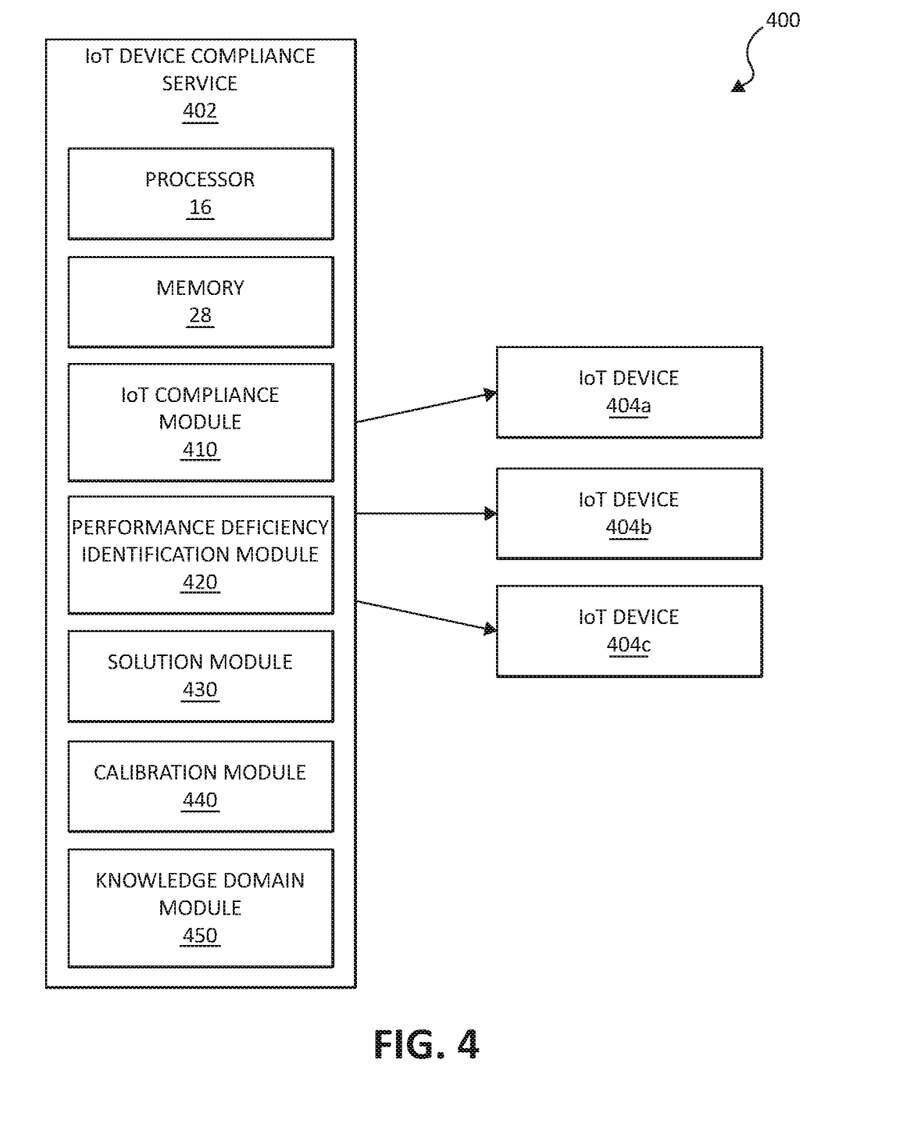
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments, is shown. As shown, the various functionality, or "modules" of functionality, hardware devices, and/or other components in the same descriptive sense as has been previously described in FIGS. 1-3 may be included in FIG. 4. For example, processing unit 16 and memory 28 of FIG. 1 may be employed in FIG. 4 to perform various computational, data processing, storage and other functionality in accordance with various aspects of the present invention.

The system 400 may include functional components such as an IoT device compliance service 402, having an IoT compliance module 410, a performance deficiency identification module 420, a solution module 430, a calibration module 440, and a knowledge domain module 450 (e.g., a knowledge database), each of which may work in communication with each other.

The IoT device compliance service 402 may be in communication with one or more IoT devices 404 (illustrated as 404a-c in FIG. 4). The IoT device compliance service 402 may determine performance capabilities, job functions, services, and/or other functionality of each IoT device, such as IoT devices 404a-c, combination of IoT devices, and/or a computing network (e.g., an IoT network) as depicted herein. The knowledge domain module 450 may parse through a knowledge domain having an ontology of legal requirements, contractual obligations, regulations, or a combination thereof to determine if each of the IoT devices 404a-c are enabled to comply with the legal requirements, contractual obligations, regulations, or a combination thereof.

The knowledge domain module 450 may continuously and automatically receive from one or more external systems via a network (not depicted for illustrative convenience) one or more legal requirements, contractual obligations, regulations, or a combination thereof to update the knowledge domain and ontology.

The IoT compliance module 410, which may work in conjunction with the performance deficiency identification module 420, may determine which of the legal requirements, contractual obligations, regulations, or a combination thereof are applicable to each of the IoT devices 404a-c or a combination thereof. A set of constraints may be created by the IoT compliance module 410 and/or the knowledge domain module 450 from the legal requirements, contractual obligations, and/or regulations in the ontology of the knowledge domain module 450 for each of the IoT devices 404a-c. The IoT compliance module 410 may determine whether or not each of the IoT devices 404a-c are compliant or non-complaint according to the created set of constraints. The performance deficiency identification module 420 may store, track, and identify each of the IoT devices 404a-c that are compliant and/or non-complaint according to the created set of constraints.

The solutions module 430 may provide, suggest, and/or apply one or more solutions for each of the IoT devices 404a-c in an IoT network that have been identified as having performance obligation deficiencies (e.g., non-compliant according to the set of constraints).

In one aspect, the knowledge domain may be an ontology of concepts representing a domain of knowledge such as, for example, an ontology of legal requirements, contractual obligations, regulations, or a combination thereof. A thesaurus or ontology may be used as the domain knowledge and may also be used to identify semantic relationships between observed and/or unobserved variables. In one aspect, the term "domain" is a term intended to have its ordinary meaning. In addition, the term "domain" may include an area of expertise for a system or a collection of material, information, content and/or other resources related to a particular subject or subjects. For example, a domain can refer to legal requirements, contractual obligations, regulations, physical phenomena, environmental, scientific, industrial, educational, statistical data, medical, commercial, health, manufacturer information, and/or biomedical-specific information. A domain can refer to information related to any particular subject matter or a combination of selected subjects.

The term ontology is also a term intended to have its ordinary meaning. In one aspect, the term ontology in its broadest sense may include anything that can modeled as ontology, including but not limited to, taxonomies, thesauri, vocabularies, and the like. For example, an ontology may include information or content relevant to a domain of interest or content of a particular class or concept. The ontology can be continuously updated with the information synchronized with the sources, adding information from the sources to the ontology as models, attributes of models, or associations between models within the ontology.

The IoT device compliance service may include using one or more heuristics and machine learning based models for performing one or more of the various aspects as described herein. In one aspect, the IoT device compliance service and machine learning based models may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back-propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instancebased learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

With the foregoing functional components in view, consider some of the various aspects of the illustrated embodiments. A determination operation may be performed to determine the job, purpose, and function of each individual sensor, as well as an entire IoT network including the sensors as well as sub-parts thereof. Contracts, laws, regulations, and/or rules (which may be included in a knowledge domain) may be parsed to identify what are the contractual obligations and legal, regulatory, and/or rules requirements. A determination may be performed for determining what parts of the law or contracts apply for each individual sensor, an entire IoT network, and/or a combination thereof. One or more legal, regulatory, and/or rule based requirements may be applied to one or more IoT devices, the combination of IoT devices, an IoT network, or a combination thereof.

In one aspect, one or more parts of the laws, regulations, and/or contracts may apply for each individual IoT sensor and IoT sensor combinations, as well as the entire IoT network. A set of constraints for those IoT device based sensors, as well as parts thereof, may be created. A determination operation may be performed to determine if there exists a usable solution region for each individual IoT device based sensor and combinations thereof. A usable solution region means that there exists a solution domain that is non-zero. For example, if a particular region such as, a city within a state, requires that heating units in a building should be turned on after October 15$^{th}$ and another region within the first region such as, a city within a state, requires that the heating units should be turned on as soon as soon as temperatures drop below 40 degrees, a usable solution region is present. Alternatively, if there is a device whose exhaust system releases particles at 1000 parts per million (ppm) and the law requires that no device should emit particles more than 200 ppm then there is no usable solution region.

If there is a usable solution region, an entire IoT network, IoT device based sensors, as well as sub-parts thereof, may be combined as a set of constraints. That is, each of the IoT devices should individually comply with the contractual obligations and legal, regulatory, and/or rules requirements. Then each of the IoT device should also comply together as a collective set. For example, a total RF emission of several IoT devices may be required to be less than a certain emission limit. The collective action being performed together by the several IoT devices should comply with the legal requirements. This is because each IoT device does not operate in isolation but works together to achieve a certain goal or objective. The performance of combined set of constraints depends on what is the ultimate objective of the entire IoT system. For example, if the set of constraints are applied on a food truck (that may include one or more IoT devices) that requires the delivery of all food items so that they are within a contractual limit of date as well as fitness to eat condition, the set of constraints should be applied as a whole to the entire IoT network. A check or determination operation may be performed to determine if each individual sensor and/or combination of IoT sensor devices (e.g., an IoT device network) are operating within a set of constraints within the given usable solution region. One or more IoT sensors may be identified as needing to be upgraded, replaced, or repaired in order to comply with legal requirements.

If all of the IoT devices are compliant, a compliance report may be issued. If each of the IoT devices are all non-compliant within the given usable solution region, the IoT devices may move (e.g., installed on a mobile object and moving when the mobile object is moved such as on a truck or a smart phone), relocate, and/or adjust the operating conditions for each individual sensor and/or combination of sensors, as well as an IoT network. The IoT sensors and sub-parts thereof may be combined, upgraded, relocated, and/or calibrated within a proposed solution region iteratively and incrementally until each individual sensor and combination of sensors become compliant. In one aspect, a non-compliance operation may be performed and recommend IoT design changes for compliance.

Figure 5A:
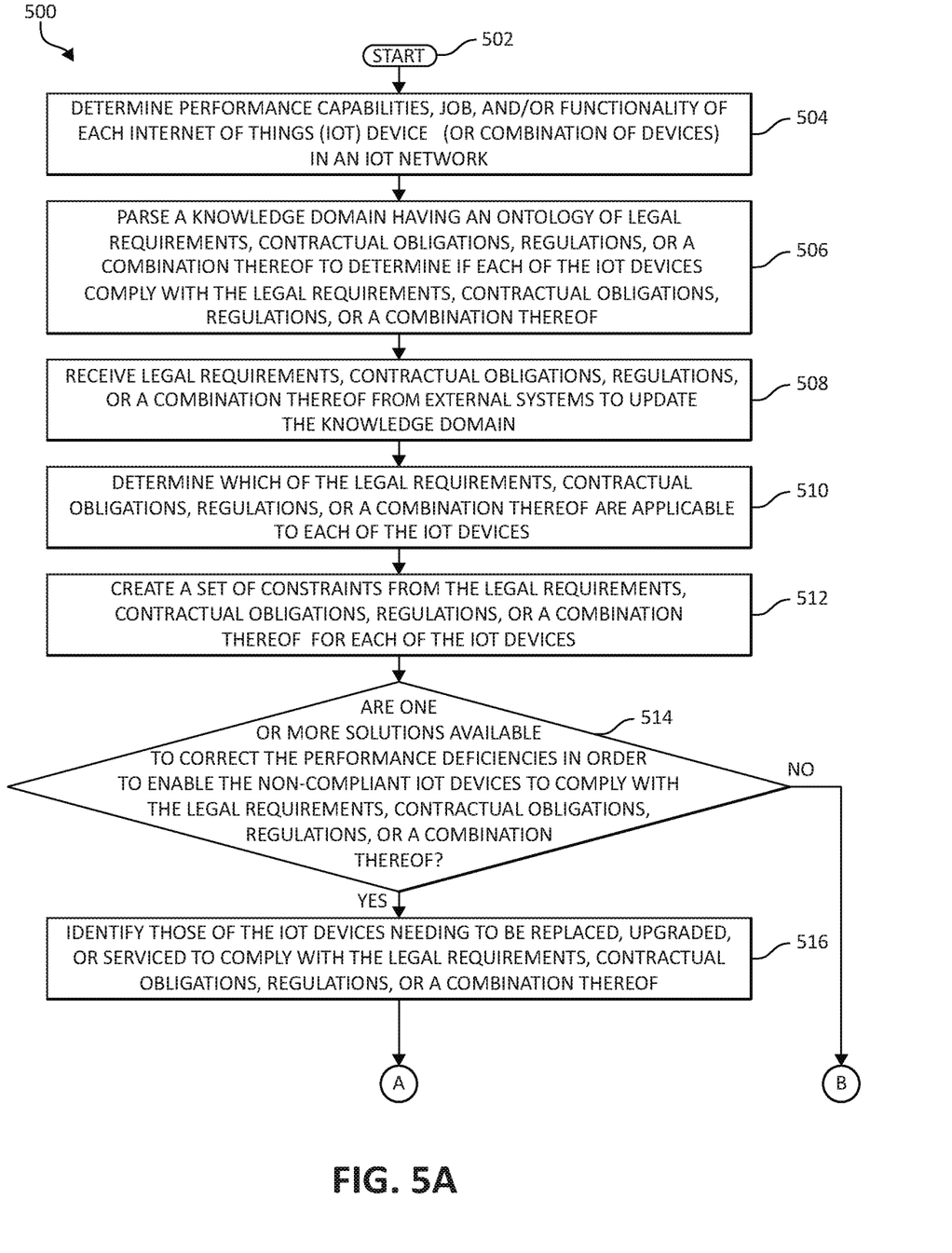
FIGS. 5A-5B are a flowchart diagram depicting an exemplary method for ensuring compliance of Internet of Things (IoT) devices in an IoT environment in which aspects of the present invention may be realized.
Figure 5B:
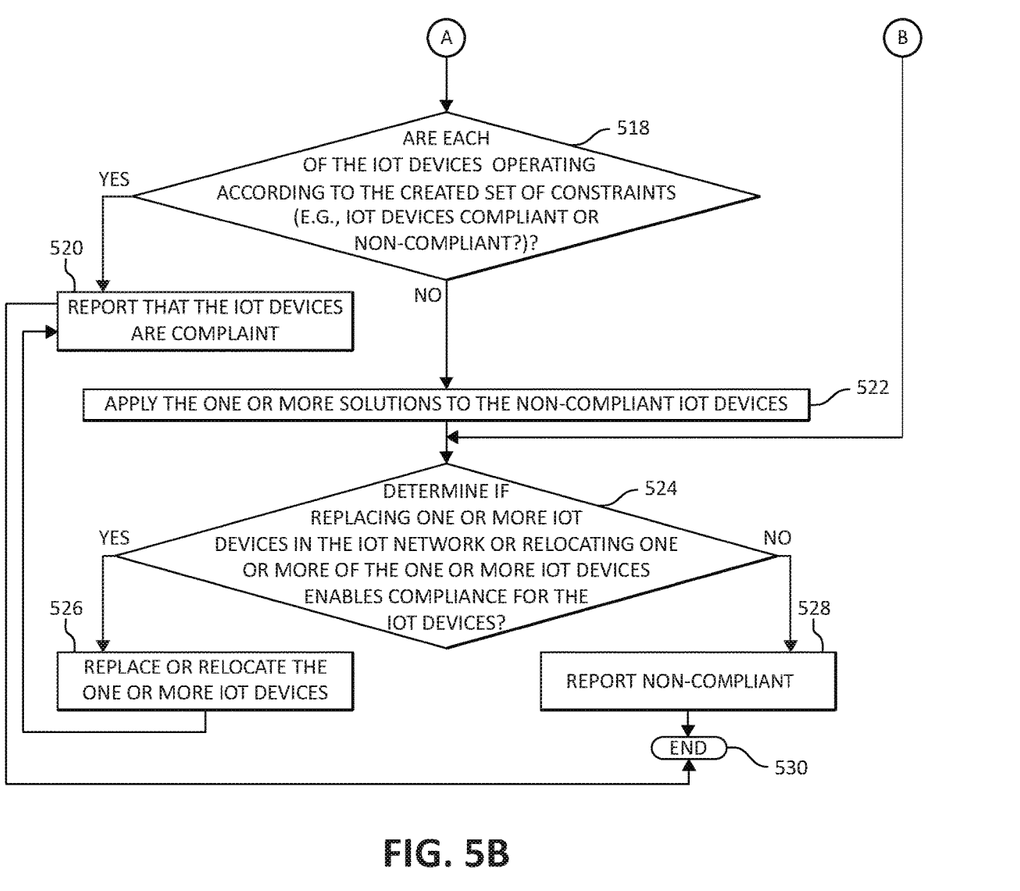

Turning now to FIGS. 5A-5B, a method 500 for ensuring compliance of IoT devices in an IoT environment by a processor is depicted, in which various aspects of the illustrated embodiments may be implemented. The functionality 500 may be implemented as a method executed as instructions on a machine, where the instructions are included on at least one computer readable medium or one non-transitory machine-readable storage medium. The functionality 500 may start in block 502. The performance capabilities, jobs, and/or functionality of each IoT device, which may be sensor based devices, or combination of devices in an IoT network, or the IoT network itself, may be determined, as in block 504. A knowledge domain, having an ontology of legal requirements, contractual obligations, regulations, or a combination thereof, may be parsed and/or analyzed to determine if each of the IoT devices do comply (or are enabled to comply) with the legal requirements, contractual obligations, regulations, or a combination thereof, as in block 506. One or more legal requirements, contractual obligations, regulations, or a combination thereof may be received from external systems to update the knowledge domain, as in block 508. It should be noted that block 508 may be an option step depending on the IoT environment and/or system preferences or architecture. A determination operation may be executed to determine which of the legal requirements, contractual obligations, regulations, or a combination thereof are applicable to each of the IoT devices, as in block 510.

A set of constraints may be created from the legal requirements, contractual obligations, regulations, or a combination thereof for each of the IoT devices, as in block 512. Moving now to block 514, a determination operation is performed to check if there are one or more solutions available to correct the performance deficiencies (e.g., non-compliant IoT devices) in order to enable the non-compliant IoT devices to comply with the legal requirements, contractual obligations, regulations, or a combination thereof. If no from block 514, the functionality may move to block 524.

If yes from block 514, the functionality may move to block 516. At block 516, those of the IoT devices needing to be replaced, upgraded, or serviced to comply with the legal requirements, contractual obligations, regulations, or a combination thereof may be identified. Moving now to block 518, a determination operation is performed to determine if each of the IoT devices are operating according to the created set of constraints (e.g., IoT devices compliant or non-compliant?). If no, the functionality 500 may move to block 522. If yes, the functionality 500 may move to 520. At block 520, the IoT devices are reported as being complaint 520. From block 520, the functionality 500 may move to block 530.

At block 522, one or more solutions may be applied to the non-compliant IoT devices. A determination operation may be performed to determine if replacing one or more IoT devices in the IoT network and/or relocating one or more of the one or more IoT devices enables compliance for the IoT devices, as in block 524. If no at block 524, the functionality 500 may move to block 528. If yes at block 524, the functionality 500 may move to 526. At block 526, the one or more IoT devices may be replaced or relocated. The functionality 500 may return back to block 520. At block 528, the IoT devices may be reported as non-compliant 528. The functionality 500 may end, as in block 530.

Figure 6:
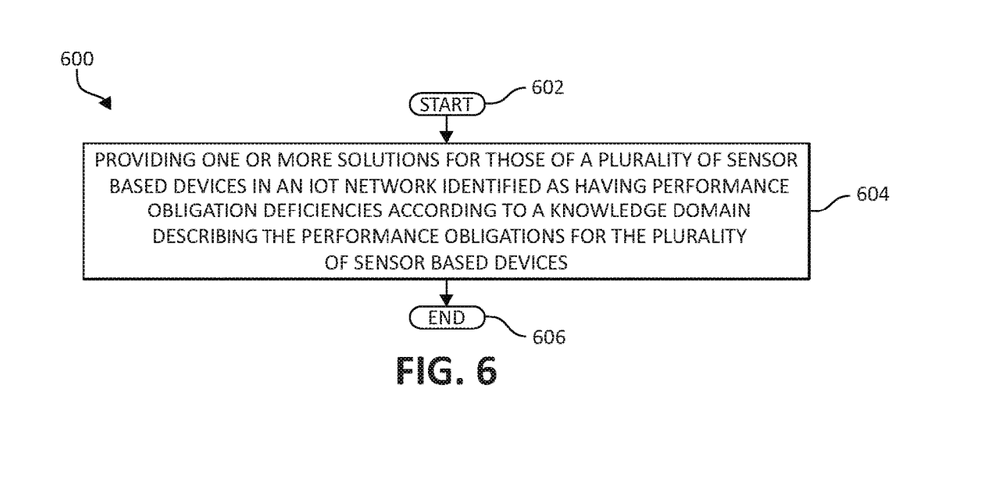
FIG. 6 is a flowchart diagram depicting an exemplary method for ensuring compliance of Internet of Things (IoT) devices in an IoT environment in which aspects of the present invention may be realized.

Turning now to FIG. 6, a method 600 for ensuring legal, contractual, and regulatory compliance of IoT devices in an IoT environment by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. The functionality 600 may start in block 602. One or more solutions may be provided for those of a plurality of sensor based devices (IoT devices) in an IoT network identified as having performance obligation deficiencies according to a knowledge domain describing the performance obligations for the plurality of sensor based devices, as in block 604. The functionality 600 may end, as in block 606. Also, one or more solutions may be provided for an IoT network, comprising one or more IoT devices, identified as having performance obligation deficiencies according to a knowledge domain describing performance obligations for the IoT network.

In one aspect, in conjunction with and/or as part of at least one block of FIG. 6, the operations of 600 may include each of the following. The operations of 600 may include identifying a performance obligation required for each of the plurality of sensor based devices, wherein the performance obligation includes performing a functionality according to legal requirements, contractual obligations, regulatory requirements, or a combination thereof.

The operations of 600 may parse through the knowledge domain having an ontology of each performance obligation of the plurality of sensor based devices. The knowledge domain may be analyzed to identify the one or more solutions to correct the performance obligation deficiencies. A performance capability may be determined of each of the plurality of sensor based devices to enable identification of the performance obligation deficiencies according to the knowledge domain. Furthermore, the operations of 600 may identify a degree of the performance obligation deficiencies according to legal requirements, contractual obligations, regulatory requirements, or a combination thereof using an ontology included in the knowledge domain, and/or receive legal requirements, contractual obligations, and regulatory requirements in the knowledge domain in the IoT network from one or more external services to enable identification of the performance obligation deficiencies for one or more of the plurality of sensor based devices. These operations provide significant benefit in that the legal requirements, contractual obligations, and/or regulatory requirements may be ingested into the knowledge domain and parsed and analyzed using natural language processing (NLP) to understand the legal requirements, contractual obligations, and/or regulatory requirements.

One or more of the IoT devices, which may be a plurality of sensor based devices, in the IoT network, identified as having the performance obligation deficiencies may be calibrated to correct the performance obligation deficiencies according to the one or more solutions. This adds another added feature and advantage over the current state of the art to ensure ongoing accuracy and assurance that the IoT sensor based devices comply with all the legal requirements, contractual obligations, and/or regulatory requirements while increasing user confidence as to the accuracy of the continual compliance.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for ensuring compliance of Internet of Things (IoT) devices in an IoT network, comprising:

parsing a knowledge domain having an ontology of performance obligations of a plurality of sensor based devices in the IoT network, wherein documents obtained externally to the knowledge domain containing all laws and regulatory requirements for a region in which the plurality of sensor based devices are currently located are ingested into the knowledge domain and subsequently filtered to determine only those portions of the documents in which legal requirements, contractual obligations, and regulatory requirements are applicable to each of the plurality of sensor based devices using natural language processing (NLP);

responsive to parsing the knowledge domain and identifying those portions of the documents that describe the performance obligations of the plurality of sensor based devices, creating a set of constraints for each of the plurality of sensor based devices according to specific parameters outlined within the performance obligations identified in the documents, wherein at least one of the specific parameters includes a temperature regulated by at least one of the plurality of sensor based devices deployed within a residence leased to a tenant by a landlord residing external to the residence being required, according to residence leasing provisions identified in those of the documents associated with municipal law, to be warmer than a first specified threshold during a first range of dates commencing in a winter season and cooler than a second specified threshold during a second range of dates commencing in a summer season, wherein the first specified threshold and the second specified threshold are respective specific temperatures the landlord is required to maintain the residence at during certain times of year when the residence has tenancy, as set forth in the leasing provisions in the municipal law;

responsive to creating the set of constraints, identifying a performance obligation deficiency in which functionality requisite to be performed by the plurality of sensor based devices is deficiently performed within the set of constraints, wherein the performance obligation deficiency includes identifying that the temperature regulated by the at least one of the plurality of sensor based devices of the residence is indicating a temperature warmer than the first specified threshold during any of the first range of dates or cooler than the second specified threshold during any of the second range of dates according to the municipal law; and providing one or more solutions, according to an identified usable solution region in those of the parsed documents, for those of the plurality of sensor based devices in the IoT network identified as having the performance obligation deficiency, wherein the one or more solutions include, based on information in the identified usable solution region in those of the parsed documents, automatically initiating a heating or cooling unit associated with the at least one of the plurality of sensor based devices to bring the temperature of the residence to the first or second specified threshold, respectively, based on a current date being within the first range of dates or the second range of dates.

2. The method of claim 1, further including analyzing the knowledge domain to identify the one or more solutions to correct the performance obligation deficiency.

3. The method of claim 1, further including determining a performance capability of each of the plurality of sensor based devices to enable identification of the performance obligation deficiency according to the knowledge domain.

4. The method of claim 1, further including:
identifying a degree of the performance obligation deficiency according to legal requirements, contractual obligations, and regulatory requirements using the ontology included in the knowledge domain; or
receiving the legal requirements, contractual obligations, and regulatory requirements in the knowledge domain in the IoT network from one or more external services to enable identification of the performance obligation deficiency for one or more of the plurality of sensor based devices.

5. A system for ensuring compliance of Internet of Things (IoT) devices, comprising:
a hardware processor, operational within and between a distributed computing environment, that:
parses a knowledge domain having an ontology of performance obligations of a plurality of sensor based devices in the IoT network, wherein documents obtained externally to the knowledge domain containing all laws and regulatory requirements for a region in which the plurality of sensor based devices are currently located are ingested into the knowledge domain and subsequently filtered to determine only those portions of the documents in which legal requirements, contractual obligations, and regulatory requirements are applicable to each of the plurality of sensor based devices using natural language processing (NLP);
responsive to parsing the knowledge domain and identifying those portions of the documents that describe the performance obligations of the plurality of sensor based devices, creates a set of constraints for each of the plurality of sensor based devices according to specific parameters outlined within the performance obligations identified in the documents, wherein at least one of the specific parameters includes a temperature regulated by at least one of the plurality of sensor based devices deployed within a residence leased to a tenant by a landlord residing external to the residence being required, according to residence leasing provisions identified in those of the documents associated with municipal law, to be warmer than a first specified threshold during a first range of dates commencing in a winter season and cooler than a second specified threshold during a second range of dates commencing in a summer season, wherein the first specified threshold and the second specified threshold are respective specific temperatures the landlord is required to maintain the residence at during certain times of year when the residence has tenancy, as set forth in the leasing provisions in the municipal law;

responsive to creating the set of constraints, identifies a performance obligation deficiency in which functionality requisite to be performed by the plurality of sensor based devices is deficiently performed within the set of constraints, wherein the performance obligation deficiency includes identifying that the temperature regulated by the at least one of the plurality of sensor based devices of the residence is indicating a temperature warmer than the first specified threshold during any of the first range of dates or cooler than the second specified threshold during any of the second range of dates according to the municipal law; and provides one or more solutions, according to an identified usable solution region in those of the parsed documents, for those of the plurality of sensor based devices in the IoT network identified as having the performance obligation deficiency, wherein the one or more solutions include, based on information in the identified usable solution region in those of the parsed documents, automatically initiating a heating or cooling unit associated with the at least one of the plurality of sensor based devices to bring the temperature of the residence to the first or second specified threshold, respectively, based on a current date being within the first range of dates or the second range of dates.

6. The system of claim 5, wherein the processor analyzes the knowledge domain to identify the one or more solutions to correct the performance obligation deficiency.

7. The system of claim 5, wherein the processor determines a performance capability of each of the plurality of sensor based devices to enable identification of the performance obligation deficiency according to the knowledge domain.

8. The system of claim 5, wherein the processor:
identifies a degree of the performance obligation deficiency according to the legal requirements, contractual obligations, and regulatory requirements using the ontology included in the knowledge domain; or
receives the legal requirements, contractual obligations, and regulatory requirements in the knowledge domain in the IoT network from one or more external services to enable identification of the performance obligation deficiency for one or more of the plurality of sensor based devices.

9. A computer program product for, by a processor, ensuring compliance of Internet of Things (IoT) devices, the computer program product comprising a non-transitory computer-readable storage medium having computer-readable program code portions stored therein, the computer-readable program code portions comprising:

an executable portion that parses a knowledge domain having an ontology of performance obligations of a plurality of sensor based devices in the IoT network, wherein documents obtained externally to the knowledge domain containing all laws and regulatory requirements for a region in which the plurality of sensor based devices are currently located are ingested into the knowledge domain and subsequently filtered to determine only those portions of the documents in which legal requirements, contractual obligations, and regulatory requirements are applicable to each of the plurality of sensor based devices using natural language processing NLP;

an executable portion that, responsive to parsing the knowledge domain and identifying those portions of the documents that describe the performance obligations of the plurality of sensor based devices, creates a set of constraints for each of the plurality of sensor based devices according to specific parameters outlined within the performance obligations identified in the documents, wherein at least one of the specific parameters includes a temperature regulated by at least one of the plurality of sensor based devices deployed within a residence leased to a tenant by a landlord residing external to the residence being required, according to residence leasing provisions identified in those of the documents associated with municipal law, to be warmer than a first specified threshold during a first range of dates commencing in a winter season and cooler than a second specified threshold during a second range of dates commencing in a summer season, wherein the first specified threshold and the second specified threshold are respective specific temperatures the landlord is required to maintain the residence at during certain times of year when the residence has tenancy, as set forth in the leasing provisions in the municipal law;

an executable portion that, responsive to creating the set of constraints, identifies a performance obligation deficiency in which functionality requisite to be performed by the plurality of sensor based devices is deficiently performed within the set of constraints, wherein the performance obligation deficiency includes identifying that the temperature regulated by the at least one of the plurality of sensor based devices of the residence is indicating a temperature warmer than the first specified threshold during any of the first range of dates or cooler than the second specified threshold during any of the second range of dates according to the municipal law; and an executable portion that provides one or more solutions, according to an identified usable solution region in those of the parsed documents, for those of the plurality of sensor based devices in the IoT network identified as having the performance obligation deficiency, wherein the one or more solutions include, based on information in the identified usable solution region in those of the parsed documents, automatically initiating a heating or cooling unit associated with the at least one of the plurality of sensor based devices to bring the temperature of the residence to the first or second specified threshold, respectively, based on a current date being within the first range of dates or the second range of dates.

10. The computer program product of claim 9, further including an executable portion that:

analyzes the knowledge domain to identify the one or more solutions to correct the performance obligation deficiency; and determines a performance capability of each of the plurality of sensor based devices to enable identification of the performance obligation deficiency according to the knowledge domain.

11. The computer program product of claim 9, further including an executable portion that:

identifies a degree of the performance obligation deficiency according to the legal requirements, contractual obligations, and regulatory requirements using the ontology included in the knowledge domain; or receives the legal requirements, contractual obligations, and regulatory requirements in the knowledge domain in the IoT network from one or more external services to enable identification of the performance obligation deficiency for one or more of the plurality of sensor based devices.

\* \* \* \* \*